April 15, 1924.

P. MUELLER

METER TESTING MACHINE

Filed March 10, 1920    4 Sheets-Sheet 1

1,490,478

Inventor
Philip Mueller
By Cushman Bryant & Darby
Attorneys

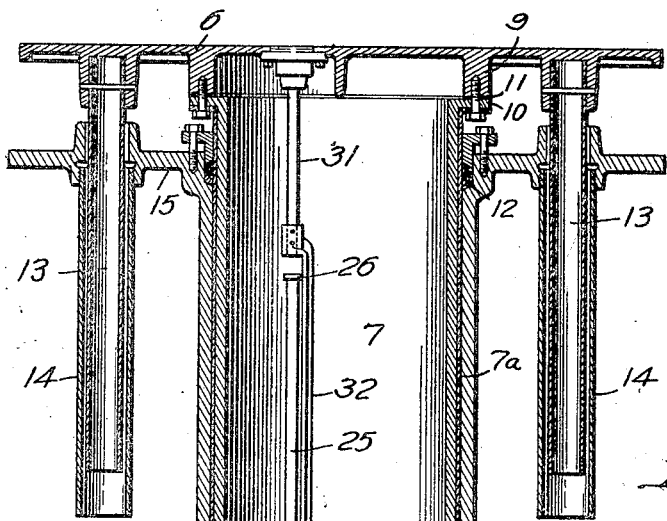
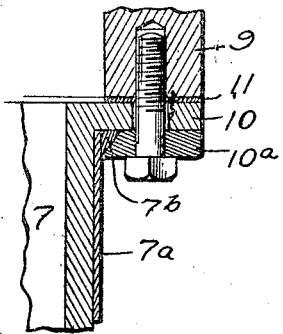
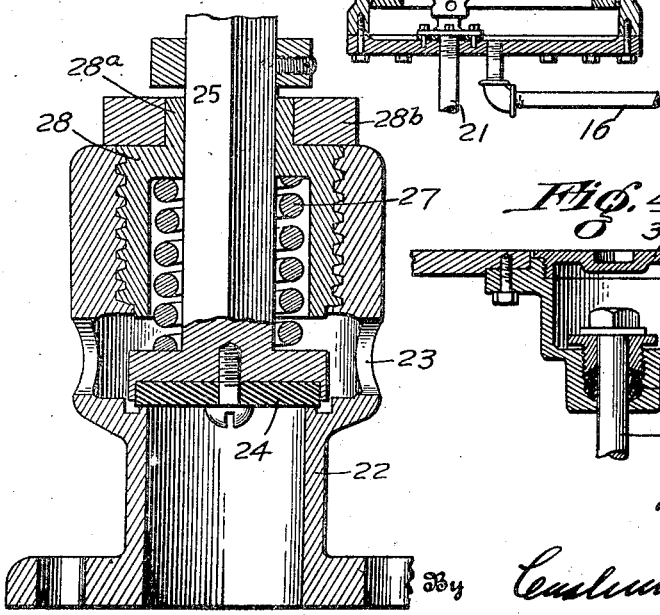
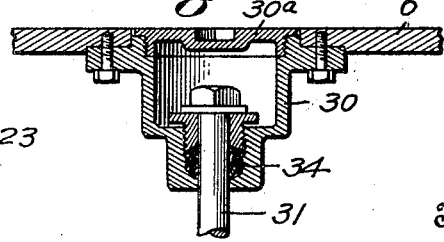

April 15, 1924.  
P. MUELLER  
METER TESTING MACHINE  
Filed March 10, 1920  
1,490,478  
4 Sheets-Sheet 3

Inventor  
Philip Mueller  
By Cushman, Bryant & Darby  
Attorneys

Patented Apr. 15, 1924.

1,490,478

UNITED STATES PATENT OFFICE.

PHILIP MUELLER, OF DECATUR, ILLINOIS, ASSIGNOR TO ADOLPH MUELLER, TRUSTEE, OF DECATUR, ILLINOIS.

METER-TESTING MACHINE.

Application filed March 10, 1920. Serial No. 364,679.

*To all whom it may concern:*

Be it known that I, PHILIP MUELLER, a citizen of the United States, residing at Decatur, in the county of Macon and State of Illinois, have invented new and useful Improvements in Meter-Testing Machines, of which the following is a specification.

The present invention relates to improvements in fluid meter testers. The machine is particularly adapted for testing water meters though it is, of course, applicable for use with gas or other fluid meter testers. Particularly the present improvements are designed for testing relatively large meters and among the purposes thereof may be noted the use of fluid actuating means for supporting the meter being tested, such means being connected with the source of fluid supply employed in testing the meter.

In the accompanying drawings:—

Fig. 2 is a vertical sectional view, on an enlarged scale, of the meter support and means for adjusting the same vertically.

Fig. 3 is a detail sectional view of the connection between the meter support and the safety valve devices controlling the same.

Figures 4 and 5 are detail views of portions of the meter support.

Figure 1:
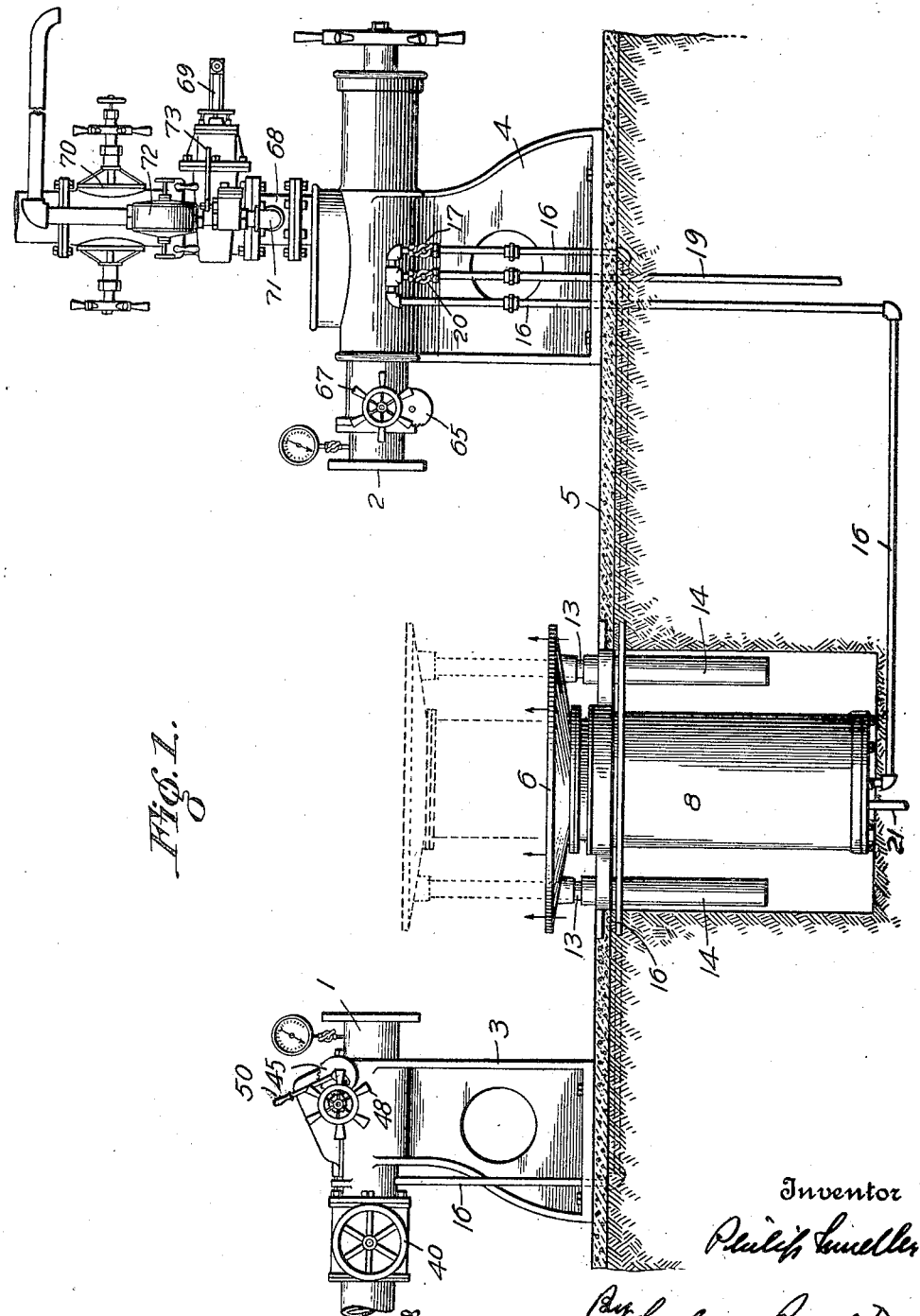
Fig. 1 is a side elevation of a meter testing apparatus embodying the present improvements.

The apparatus comprises fluid supply and discharge heads 1, 2, which are carried by pedestals 3, 4, shown as relatively heavy castings bolted or otherwise secured to a concrete or other suitable foundation 5. The supply head 1 is stationary relative to its supporting pedestal while the discharge head 2 is supported, as will be hereinafter more fully described, so that it may be adjusted longitudinally toward and from the head 1 so that the meter to be tested may be properly engaged by said heads.

The meter support comprises a table or platform 6 which is carried at the upper end of a cylindrical piston 7 that extends into a cylinder 8 arranged in a suitable cavity in the earth and to which fluid is supplied for elevating the meter support.

As shown, the table or support 6 is provided with an annular depending rib or flange 9 which is connected by screws or similar fastening means with an annular flange 10 at the upper end of the piston 7, a gasket 11 being interposed between said rib or piston to form a fluid-tight connection. Exteriorly the cylinder 7 is provided with a jacket 7ª of brass or similar material so that it can move freely in the cylinder 8. A body of packing 12 is provided for making a fluid-tight connection between the upper end of the cylinder and the piston therein; and a packing 7ᵇ is arranged between the jacket 7ª and a ring 10ª that is held against the flange 10 by the screws or bolts which connect the said flange with the rib 9. Turning movement of the piston and table 6 thereon is prevented by tubular guides 13 that depend from said table and extend into cylindrical casings 14 that are connected as at 15 to the cylinder 8.

Fluid for lifting the table 6 is supplied to the cylinder 8 through a pipe 16 which is connected with the supply head 1, a suitable valve 17 being provided in said pipe for controlling the flow of fluid from the main supply pipe to the cylinder. Connected with the pipe 16 between the valve 17 therein and the cylinder 8 is a waste pipe 19 having therein a valve 20. The cylinder 8 is provided with a drain outlet 21 which extends through the bottom of the cylinder and communicates with a valve casing 22 shown as bolted to the bottom of the cylinder interiorly thereof. This casing is provided with a plurality of lateral openings 23 arranged above a valve seat with which cooperates a valve 24, the stem 25 of which extends upwardly within the cylinder 8 terminating in an enlarged head 26. A spring 27 arranged between the valve 24 and a threaded member 28 that is screwed into the casing 22 acts to normally hold the valve against its seat and prevent the escape of fluid from the cylinder. Means are provided whereby should the table-like support 6 be elevated slightly beyond the required distance to properly position the inlet and outlet openings of the meter to be tested in alinement with the passages through the heads 1 and 2 the valve 24 will be lifted and even if the valve 17 is not properly closed the excess fluid supplied to the cylinder will be allowed to escape through the ports 23 and the pipe 21 and thus stop the upward movement of the support. As shown, a depending casing 30 is connected with the lower face of the meter support 6, about an aperture therein and into this casing extends the upper end of a rod 31 which is connected with a yoke 32 terminating at its lower end in a sleeve 33 which surrounds the valve stem 25. Suitable packing 34 is provided to prevent the escape of fluid into the casing 30 and the upper open end of said casing is closed by a removable plug 30ª. The upper end of the rod 31 is so shaped that it may be readily engaged by a suitable wrench when the covering plate or plug 30ª is removed and as the rod 25 and sleeve 33 which fits thereabout are of polygonal form in cross section it will be seen that by turning said rod, by such a wrench, rotary movement will be imparted to the valve stem and the member 28 of the valve within the sleeve. As shown in Fig. 3 the member 28 is provided with an upwardly extending neck portion 28ª which closely embraces the polygonal valve stem 25 so that rotary movement of said stem is communicated to the member 28. A washer or collar 28ᵇ is fitted about the neck 28ª of the member 28 and when the valve stem is turned as above described said ring and the upper end of the member 28 will be caused to contact with a collar 25ª, secured by suitable set screw to the valve stem, and thus lift the valve 24 from its seat so that fluid can drain from the cylinder through the waste pipe 21.

Figure 9:
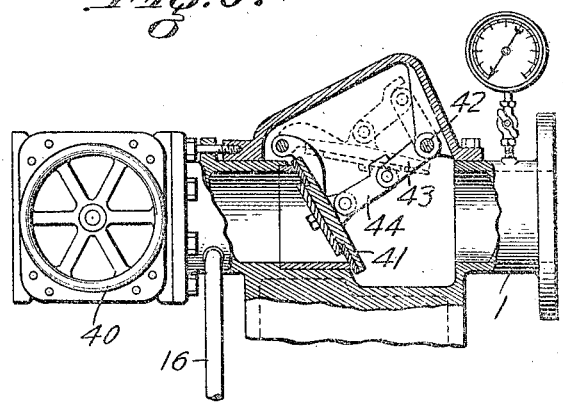
Figures 9, 10 and 11 are detail views of the valve mechanism of the supply head.
Figure 10:
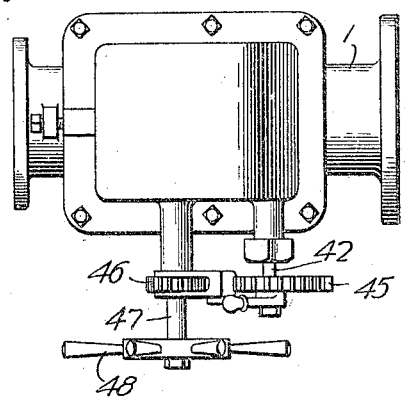
Figure 11:
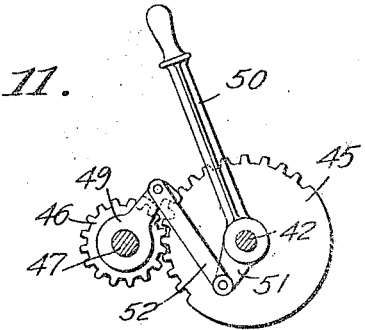

The fluid supply head is provided with a gate valve controlled by a hand wheel 40 and with a swinging valve 41, the aforesaid pipe 16 for supplying water to the elevating mechanism communicating with said head between these valves. The valve 41 is adapted to be lifted from its seat by turning a shaft 42 to which is connected an arm 43 that engages an arm 44 extending outwardly from the valve. The shaft 42 extends to the outside of the head through a suitably packed passage and on the projecting portion thereof is secured a gear 45. This meshes with a pinion 46 on a shaft 47 suitably journaled in the supply head and having at its outer end a hand wheel 48 by means of which it may be turned. Means are provided whereby normally the valve 41 is locked to its seat, said means include a pawl 49 loosely mounted on the shaft 47 and having at its free end a tooth that normally engages the teeth of the gear 45. A lever 50 loosely fulcrumed on the shaft 42 has an arm 51 which is connected by a link 52 with the pawl 49 and by turning said lever the pawl can be dropped from engagement with the gear 45 and then, by turning the hand wheel 48, the shaft 42 may be rocked to swing the valve to open position as represented by dotted lines in Fig. 9.

Figure 6:
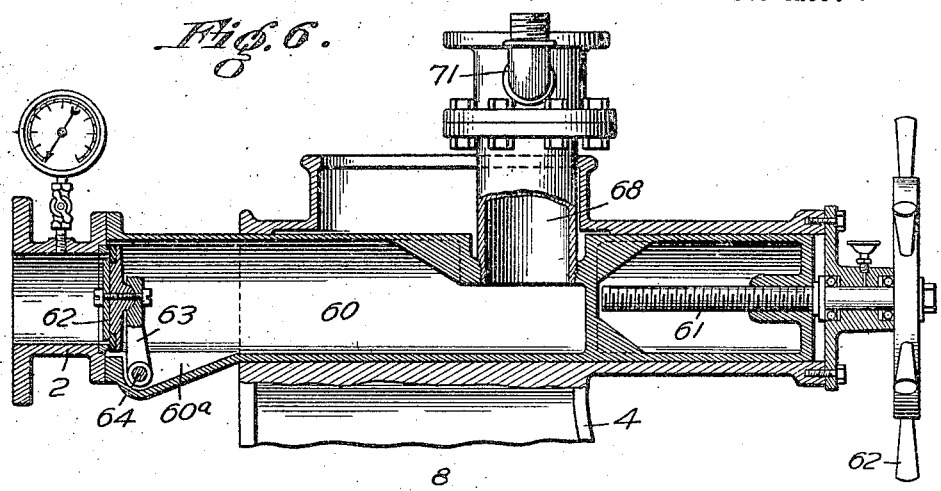
Fig. 6 is a longitudinal section through the discharge head of the testing apparatus.
Figure 7:
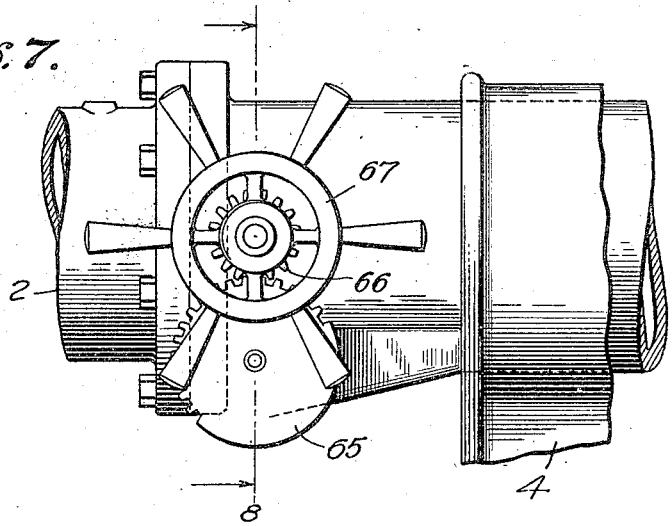
Figures 7 and 8 are respectively a side view and a transverse section through the discharge head, illustrating particularly the valve therein.
Figure 8:
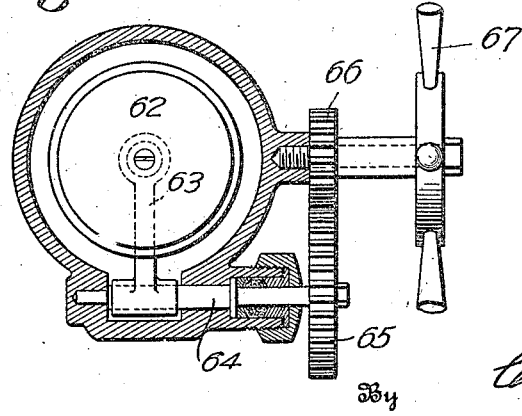

The discharge head 2 is carried at one end of a sleeve 60 that extends through a suitable passage in the pedestal 4 and by means of a screw 61 and hand wheel 62 connected therewith said sleeve 60 and the head 2 may be adjusted longitudinally toward and from the relatively stationary supply head 1. A valve 62 carried by an arm 63 extending from a shaft 64 normally closes the fluid passage through said discharge head as shown in Fig. 6. The shaft 64 extends to the outside of the sleeve 60 and on its outer end is secured a gear 65 with which meshes a pinion 66 on a short shaft having at its outer end a hand wheel 67. It will be readily seen that by turning the wheel 67 the valve 62 can be moved to or from a position where it will close the fluid passage through the discharge head, a recess 60ª being provided to receive the arm 63 when the valve is in open position so that the latter will then offer no practical obstruction to the flow of fluid through the discharge head, sleeve 60 and pipe 68 leading therefrom.

A suitable gate valve actuated by a member 69 is provided for controlling the flow of fluid through the outlet pipe 68 and the apparatus illustrated is further provided with a large multiple cock 70. A branch pipe 21 of considerably less diameter than the outlet 68 leads from said outlet pipe to a multiple cock 72 and a gate valve controlled by a lever 73 is arranged in said branch duct.

The general arrangement of parts and the construction of a number of the elements of the apparatus hereinbefore described is similar to that of an earlier Patent No. 1,038,182 dated September 10, 1912, and therefore some of the illustration herein is more or less conventional. The present apparatus is designed particularly for testing meters of such size and weight as cannot be readily handled with a machine or apparatus of the construction shown in the patent referred to, the present improvements relating more particularly to the meter supporting devices and means for adjusting the same vertically.

It is believed that the manner of using and the advantages incident to such an apparatus as is hereinbefore described and illustrated in the drawings will be readily understood and appreciated.

The gate valve 40 of the supply head may be open continuously but the valves 41, 17 and 20 are normally closed. Normally the meter support 6 will occupy the position shown in full lines in Fig. 1. After a meter to be tested has been positioned on said support the valve 17 will be opened and fluid admitted through the pipe 16 to the lower end of the cylinder 8 thus raising the piston therein until the meter to be tested reaches a level where its inlet and outlet passages will be in proper alinement with the supply and discharge heads. In case the valve 17 is not properly closed when the parts are in this relation continued upward movement of the meter support will cause the sleeve 33 to engage the head 26 of the valve 24 and lift the latter from its seat so that the excess fluid may freely escape through the pipe 21. Therefore the piston or plunger connected with the meter support is automatically stopped when it reaches the elevation approximating that of the centers of the inlet and outlet heads. Then, in order to lower the meter support to bring the meter into alinement with the supply and discharge heads, it is only necessary to slightly open valve 20, when a sufficient amount of the fluid contained in the cylinder 8 will be forced out through pipes 16 and 19 to bring the meter into proper alinement. Valve 20 is then again closed. By manipulating the hand wheel 62 the discharge head will be brought into proper engagement with the meter and the latter caused to properly engage the supply head 1, after which, by proper manipulation of the several valves, in the manner described in the patent hereinbefore referred to, fluid will be caused to flow from the head 1 through the meter to the discharge head. In order to lower the meter or return the parts to the position shown in Fig. 1 the valve 41 is closed and the valve 20 opened when the fluid contained in the cylinder 8 will be forced out through the pipes 16 and 19. If it is desired to entirely drain the cylinder the rod 31 may be rotated as before described to cause the member 28 of the valve casing within the cylinder to be elevated and through the collar 35ª lift the valve from its seat. By closing the valve 62 when removing a meter from testing position waste of water contained in the discharge head will be avoided and several meters can be tested in succession more expeditiously than if this valve is left open and water in said valve allowed to escape after each operation.

Having thus described the invention what is claimed is:—

1. A meter tester comprising suitable fluid supply and discharge heads adapted to be connected with the inlet and outlet openings of a meter casing, a vertically movable support for a meter to be tested, hydraulic means for elevating said support and maintaining it in position to enable a meter thereon to be coupled to said heads, and automatically acting means for limiting upward movement of the meter support.

2. A water meter tester comprising a suitable supply and discharge head adapted to be connected with the inlet and outlet openings of a meter casing, a vertically adjustable meter support between said heads, and a hydraulic means connected with the supply head and adapted to elevate the meter support and maintain a meter thereon in position to be coupled to said heads.

3. A meter tester comprising suitable fluid supply and discharge heads adapted to be connected with the inlet and outlet openings of a meter casing, a vertically movable support for a meter to be tested, a vertically arranged cylinder between said heads, a plunger extending through the upper end of the cylinder and adapted to support a meter to be tested, connections between the supply head and said cylinder, whereby water may be supplied to the cylinder to raise the plunger and bring a meter thereon into position to be coupled to said heads, and means for permitting the escape of water from the cylinder.

4. A meter tester comprising suitable fluid supply and discharge heads adapted to be connected with the inlet and outlet openings of a meter casing, a vertically movable support for a meter to be tested, a vertically arranged cylinder between said heads, a plunger extending through the upper end of the cylinder and adapted to support a meter to be tested, connections between the supply head and said cylinder, whereby water may be supplied to the cylinder to raise the plunger and bring a meter thereon into position to be coupled to said heads, means for limiting upward movement of the plunger, and means for permitting the escape of water from the cylinder.

5. In a meter tester, the combination of supply and discharge heads adapted to be connected respectively with inlet and outlet openings of a meter casing, a vertical cylinder between said heads and below the horizontal plane thereof, a plunger within and projecting above the cylinder and adapted to support a meter to be tested, means for supplying fluid under pressure to the cylinder to elevate the plunger and bring a meter thereon into position to be coupled to said heads, a valve controlling an outlet from the cylinder, and means moving vertically with the plunger adapted to automatically actuate said valve to open the outlet controlled thereby when the plunger is elevated to a predetermined extent.

6. In a meter tester, the combination of supply and discharge heads adapted to be connected respectively with inlet and outlet openings of a meter casing, a vertical cylinder between said heads and below the horizontal plane thereof, a plunger within and projecting above the cylinder and adapted to support a meter to be tested, means for supplying fluid under pressure to the cylinder to elevate the plunger and bring a meter thereon into position to be coupled to said heads, a valve controlling an outlet through the bottom of the cylinder and provided with an upwardly extending stem, and a member carried by the plunger and adapted to engage the valve stem and adjust the valve to open the outlet controlled thereby when the plunger is elevated to a predetermined extent.

7. In a meter tester, the combination of supply and discharge heads adapted to be connected respectively with inlet and outlet openings of a meter casing, a vertical cylinder between said heads and below the horizontal plane thereof, a plunger within and projecting above the cylinder, a table for supporting a meter mounted on the upper end of the plunger and provided with a plurality of depending members, guides for said members supported by the cylinder, means for supplying fluid under pressure to the cylinder, a valve within the cylinder controlling an outlet therefrom, and means connected with the meter support for actuating the valve to open the outlet controlled thereby when the plunger has been raised to a predetermined extent.

8. In a meter tester, the combination of supply and discharge heads adapted to be connected respectively with inlet and outlet openings of a meter casing, a vertical cylinder between said heads and below the horizontal plane thereof, a plunger within and projecting above the cylinder and adapted to supported a meter to be tested, means for supplying fluid under pressure to the cylinder to elevate the plunger and bring a meter thereon into position to be coupled to said heads, a valve controlling an outlet from the cylinder, means connected with the plunger adapted to actuate the valve to open said outlet when the plunger is raised a predetermined extent, and means for effecting relative adjustment between the valve and said actuating member connected with the plunger.

9. In a meter tester, the combination of supply and discharge heads adapted to be connected with inlet and outlet openings of a meter casing, a table-like support for a meter to be tested, a hydraulic elevator connected with said support and adapted to adjust it to bring a meter casing thereon into position to be coupled to said heads, means for automatically limiting movement of said support toward the plane of said heads, and a common source of supply for the elevator and the supply head.

10. In a meter tester, the combination of supply and discharge heads adapted to be connected respectively with inlet and outlet openings of a meter casing, a vertical cylinder between said heads and below the horizontal plane thereof, a plunger within and projecting above the cylinder and adapted to support a meter to be tested, means for supplying fluid under pressure to the cylinder to elevate the plunger and bring a meter thereon into position to be coupled to said heads, a valve within the cylinder controlling an outlet therefrom, and means for automatically actuating said valve when the plunger is elevated to a predetermined extent.

11. In a fluid meter testing machine, the combination of two heads adapted to be respectively connected with the inlet and outlet openings of a meter, a vertically movable support for a meter to be tested adapted to position a meter thereon for connection with said heads, a hydraulic elevating means having its movable member connected to the meter support, means for supplying water to said elevating means, and means for automatically checking the relative movement of the elements of the hydraulic elevating means and permitting the excess water to waste therefrom when the meter support is in operative relation to the supply and discharge heads.

12. In a fluid meter testing machine, the combination of two heads adapted to be respectively connected with the inlet and outlet openings of a meter, a vertically movable support for a meter to be tested adapted to position a meter thereon for connection with said heads, a cylinder, a plunger within and extending beyond one end of the cylinder, means connected with the plunger for supporting a meter to be tested, a spring pressed valve normally closing a waste outlet from the cylinder, means for supplying fluid to the cylinder to move the plunger therein and bring the meter support into operative relation to said heads and means for automatically actuating the waste valve when the meter support is in said position.

13. A fluid meter testing machine comprising relatively elevated fluid supply and discharge heads, a support for a meter to be tested movable from a plane near the base of the supply and discharge heads to a materially higher plane where the inlet and outlet openings of the meter will be in alignment with the fluid passages in the supply and discharge heads, and hydraulic means for elevating said support and the meter and maintaining them at an elevation where the inlet and outlet openings of the meter casing are in alignment with the fluid passages in the supply and discharge heads.

14. A fluid meter tester comprising suitable supply and discharge heads having relatively elevated fluid passages adapted to be connected with the inlet and outlet openings of a meter casing, a vertically movable support for a meter to be tested positioned between said heads, hydraulic means for elevating the support from a level or plane adjacent that of the bases of the supply and discharge heads to a plane where the inlet and supply openings of a meter thereon will be in alignment with the fluid passages in the supply and discharge heads, said means including a relatively movable cylinder and piston, one of which is connected to the meter support, and means within the cylinder for automatically checking relative movement between the piston and cylinder when the meter support reaches a predetermined height.

In testimony whereof I have hereunto set my hand.

PHILIP MUELLER.